United States Patent
Watanabe

(10) Patent No.: US 11,750,764 B2
(45) Date of Patent: Sep. 5, 2023

(54) CHART, IMAGE FORMING APPARATUS, IMAGE PROCESSING APPARATUS, AND STORAGE MEDIUM

(71) Applicant: Naoto Watanabe, Kanagawa (JP)

(72) Inventor: Naoto Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/654,273

(22) Filed: Mar. 10, 2022

(65) Prior Publication Data
US 2022/0311908 A1    Sep. 29, 2022

(30) Foreign Application Priority Data
Mar. 24, 2021    (JP) ................................ 2021-050035

(51) Int. Cl.
*H04N 1/60*    (2006.01)
*H04N 1/00*    (2006.01)
*H04N 1/23*    (2006.01)

(52) U.S. Cl.
CPC ....... *H04N 1/6072* (2013.01); *H04N 1/00816* (2013.01); *H04N 1/233* (2013.01)

(58) Field of Classification Search
CPC ... H04N 1/6072; H04N 1/00816; H04N 1/233
See application file for complete search history.

(56) References Cited

U.S. PATENT DOCUMENTS

| | | | | |
|---|---|---|---|---|
| 6,330,976 B1* | 12/2001 | Dymetman | ........ | H04N 1/32042 235/487 |
| 6,442,497 B1* | 8/2002 | Houston | ............ | H04N 1/00002 399/49 |
| 6,972,867 B1* | 12/2005 | Venable | ............... | H04N 1/6033 358/1.9 |
| 8,035,861 B2* | 10/2011 | Kamijo | .............. | H04N 1/00087 358/468 |
| 2004/0051885 A1* | 3/2004 | Matsunoshita | .... | H04N 1/00846 358/1.9 |
| 2004/0114157 A1* | 6/2004 | Linder | ................. | H04N 1/6033 358/1.9 |
| 2004/0184051 A1* | 9/2004 | Bailey | ................. | H04N 1/6033 358/1.9 |
| 2007/0045427 A1* | 3/2007 | Onishi | .............. | H04N 1/32208 235/494 |

(Continued)

FOREIGN PATENT DOCUMENTS

| | | |
|---|---|---|
| JP | 2015-119269 | 6/2015 |
| JP | 2016-208151 | 12/2016 |

(Continued)

OTHER PUBLICATIONS

Extended European Search Report for EP22160522.3 dated Aug. 3, 2022.

*Primary Examiner* — Ted W Barnes
(74) *Attorney, Agent, or Firm* — IPUSA, PLLC

(57) ABSTRACT

A chart includes a plurality of area images. Each area image of the plurality of area images includes a figure. The figure indicates positional information of each area image of the plurality of area images in the chart. An image forming apparatus includes an image forming device configured to form an image on a sheet to create the chart, and an image reading device configured to read the image in the chart.

11 Claims, 14 Drawing Sheets

(56) References Cited

U.S. PATENT DOCUMENTS

| | | | | |
|---|---|---|---|---|
| 2007/0280711 | A1* | 12/2007 | Yoshimura | B41J 11/008 399/45 |
| 2008/0193051 | A1* | 8/2008 | Murata | H04N 1/00801 382/309 |
| 2009/0231623 | A1* | 9/2009 | Kuwahara | G06K 15/1806 358/1.15 |
| 2010/0161637 | A1* | 6/2010 | Hardy | G06F 16/93 707/E17.014 |
| 2011/0032380 | A1* | 2/2011 | Ishida | H04N 1/6033 348/E9.051 |
| 2012/0033273 | A1* | 2/2012 | Klassen | H04N 1/6022 358/518 |
| 2012/0037695 | A1* | 2/2012 | Liu | G06F 16/9554 235/494 |
| 2012/0081722 | A1* | 4/2012 | Katayama | G06K 15/1878 358/1.9 |
| 2012/0155899 | A1 | 6/2012 | Watanabe et al. | |
| 2015/0169255 | A1* | 6/2015 | Arakawa | H04N 1/4097 358/1.14 |
| 2016/0127571 | A1* | 5/2016 | Kamisoyama | H04N 1/00588 358/488 |
| 2017/0054876 | A1* | 2/2017 | Matsuzaki | H04N 1/00037 |
| 2017/0274643 | A1* | 9/2017 | Takeuchi | H04N 1/6033 |
| 2017/0314994 | A1* | 11/2017 | Tanimura | H04N 1/60 |
| 2018/0041646 | A1* | 2/2018 | Inami | H04N 1/6033 |
| 2018/0045572 | A1* | 2/2018 | Harada | G06T 1/00 |
| 2018/0107968 | A1* | 4/2018 | Wu | G06Q 10/087 |
| 2018/0198937 | A1* | 7/2018 | Yoshizawa | H04N 1/00702 |
| 2019/0028614 | A1* | 1/2019 | De Paepe | G01J 3/522 |
| 2019/0147308 | A1* | 5/2019 | Yamamoto | G06K 15/027 358/3.24 |
| 2019/0260911 | A1* | 8/2019 | Toriyabe | H04N 1/6008 |
| 2019/0301941 | A1* | 10/2019 | Kawabata | G01J 3/52 |
| 2020/0241816 | A1* | 7/2020 | Miyazaki | G06F 3/1234 |
| 2020/0320660 | A1* | 10/2020 | Kamath | G06N 3/084 |
| 2021/0247714 | A1* | 8/2021 | Watanabe | G03G 15/6582 |
| 2021/0262861 | A1* | 8/2021 | Kimpe | G06K 7/1417 |

FOREIGN PATENT DOCUMENTS

| | | | | |
|---|---|---|---|---|
| JP | | 2016208151 A | * 12/2016 | |
| JP | | 2020172041 A | * 10/2020 | |
| WO | WO-2009045850 A1 | * 4/2009 | | H04N 1/6033 |

* cited by examiner

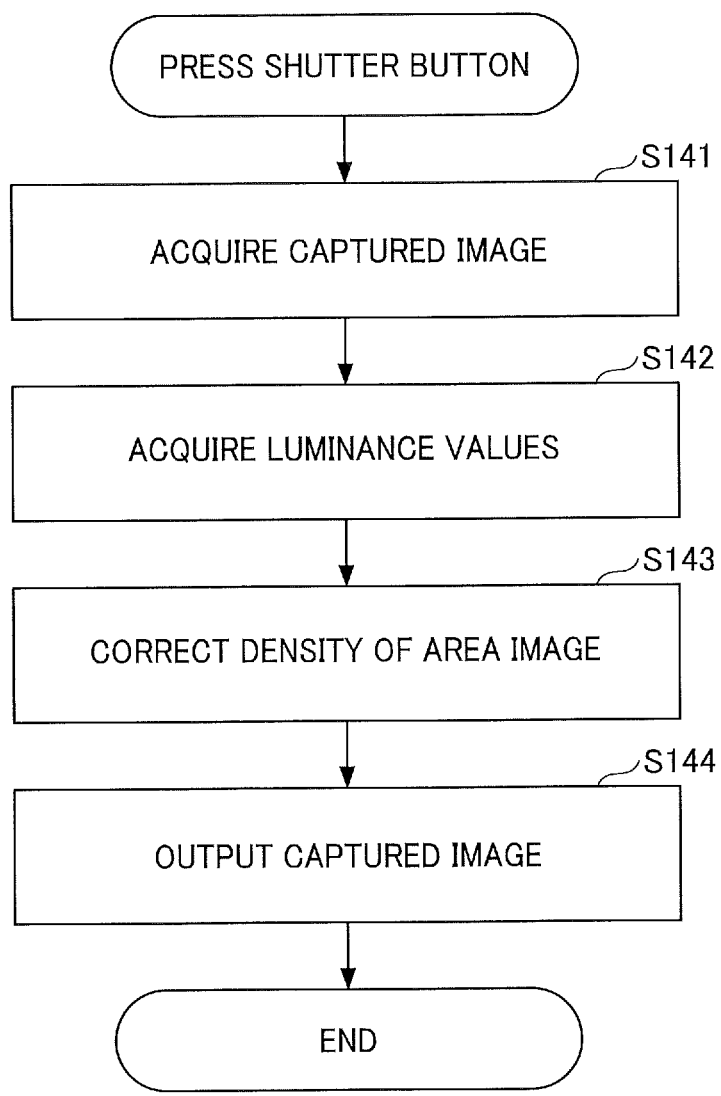

US 11,750,764 B2

CHART, IMAGE FORMING APPARATUS, IMAGE PROCESSING APPARATUS, AND STORAGE MEDIUM

CROSS-REFERENCE TO RELATED APPLICATION

This patent application is based on and claims priority pursuant to 35 U.S.C. § 119(a) to Japanese Patent Application No. 2021-050035, filed on Mar. 24, 2021, in the Japan Patent Office, the entire disclosure of which is hereby incorporated by reference herein.

BACKGROUND

Technical Field

Embodiments of the present disclosure relate to a chart, an image forming apparatus, an image processing apparatus, and a storage medium.

Background Art

For determining an abnormality of a print image by an image forming apparatus, technologies are known in the art to use a chart of an area image such as a test image formed on a recording medium by an image forming apparatus that is an object to be determined (determination object).

In addition, in order to reduce the number of charts, some known image forming apparatuses have a configuration in which image data is obtained by reading an image formed by an image forming device, image feature information of the image data included in an area designated by a user is acquired with respect to the image data, and a cause of occurrence of the defective image is analyzed using a reading result of a chart selected and formed using the image feature information.

SUMMARY

Embodiments of the present disclosure described herein provide a novel chart including a plurality of area images. Each area image of the plurality of area images includes a figure indicating positional information of each area image of the plurality of area images in the chart.

Further, embodiments of the present disclosure described herein provide an image forming apparatus including an image forming device and an image reading device. The image forming device forms an image on a sheet to create the above-described chart. The image reading device reads the image in the above-described chart.

Further, embodiments of the present disclosure described herein provide an image processing apparatus including processing circuitry. The processing circuitry process a read image of a chart including a plurality of area images. Each area image of the plurality of area images includes a figure indicating positional information of the plurality of area images in the chart, and a correction pattern to correct density of the plurality of area images in the chart. The processing circuitry corrects density of the read image based on density of the correction pattern in the read image of the chart.

Further, embodiments of the present disclosure described herein provide a non-transitory, computer-readable storage medium storing computer-readable program code that causes a computer to execute processing a read image of a chart including a plurality of area images, each area image of the plurality of area images including a figure that indicates positional information of the plurality of area images in the chart, and a correction pattern to correct density of the plurality of area images in the chart, and correcting density of the read image based on density of the correction pattern in the read image of the chart.

BRIEF DESCRIPTION OF THE SEVERAL VIEWS OF THE DRAWINGS

Exemplary embodiments of this disclosure will be described in detail based on the following figures, wherein:

FIG. 14 is a flowchart of a process executed by the processing unit included in the smartphone.

Figure 1:
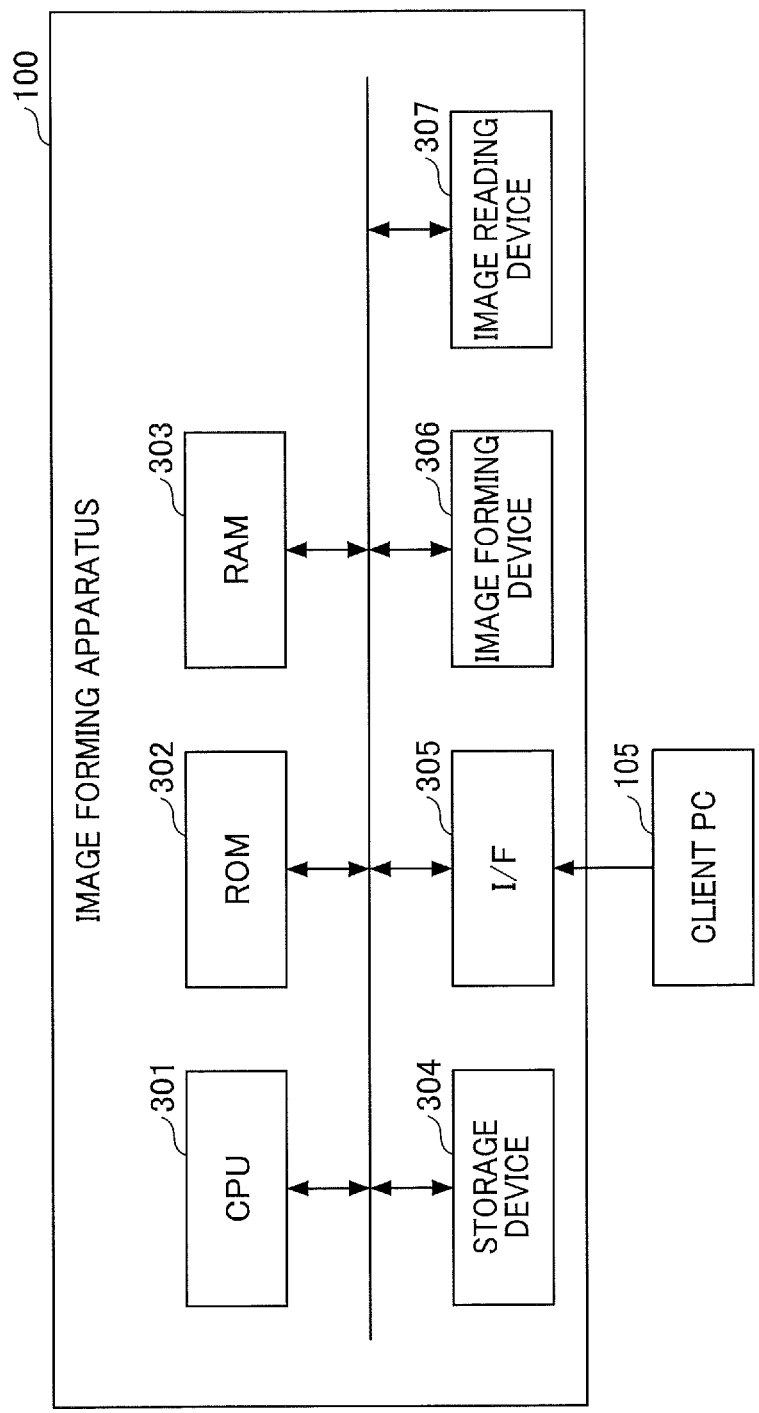
FIG. 1 is a block diagram illustrating an example of a hardware configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

A description is given of a chart according to an embodiment of the present disclosure with reference to drawings. In the drawings, like reference signs denote like elements, and overlapping description may be omitted where appropriate.

Further, the embodiments described below are some examples of a chart, an image forming apparatus, an image processing apparatus, and a storage medium, for embodying the technical idea of the present disclosure, and embodiments of the present disclosure are not limited to the embodiments described below. For example, the size, material, and shape of components and the relative positions of the arranged components are given by way of example in the following description, and the scope of the present disclosure is not limited thereto unless particularly specified. The size, positional relationship, and the like of members illustrated in the drawings may be magnified for clarity of description.

For determining an abnormality of a printed image by an image forming apparatus according to an embodiment of the present disclosure, a chart according to an embodiment of the present disclosure has an area image such as a test image formed on a recording medium by an image forming apparatus that is an object to be determined (determination object). Since the type or position of the defective image is different depending on the abnormality occurring in the image forming apparatus, the abnormality of the image forming apparatus is determined based on the defective image included in the chart.

The determination of an abnormality in an image forming apparatus refers to determination of whether there is an abnormality in the image forming apparatus. When there is an abnormality, the cause of the abnormality is determined to take measures to eliminate the abnormality. In an embodiment of the present disclosure, the determination of an abnormality is performed by a person who has visually recognized the chart. The person may be, for example, a user who uses an image forming apparatus, an administrator who administrates the image forming apparatus, a service representative who perform maintenance of the image forming apparatus, or a printing operator who performs a printing service using the image forming apparatus.

A recording medium on which an area image in the chart according to an embodiment of the present disclosure is formed includes a sheet material such as a recording sheet (transfer sheet). Specific examples of the recording medium may include coated paper, thick paper, overhead projector (OHP) transparencies, plastic films, prepregs, and copper foil, provided that an image is recordable on the medium.

Hereinafter, a detailed description of a chart is given of an embodiment of the present disclosure with reference to the drawings.

EMBODIMENTS

Now, a description is given of a configuration of an image forming apparatus 100 that functions as determination object. The image forming apparatus 100 forms a chart according to an embodiment of the present disclosure.

Example of Hardware Configuration of Image Forming Apparatus 100

FIG. 1 is a block diagram illustrating an example of a hardware configuration of the image forming apparatus 100.

As illustrated in FIG. 1, the image forming apparatus 100 includes a central processing unit (CPU) 301, a read only memory (ROM) 302, a random access memory (RAM) 303, a storage device 304 such as a hard disk drive (HDD) and a solid state drive (SSD), an interface (I/F) 305, an image forming device 306, and an image reading device 307.

The CPU 301 executes a program stored in the ROM 302 using the RAM 303 as a work area. By so doing, the overall operations of the image forming apparatus 100 are controlled to provide various functions described below.

The storage device 304 such as a hard disk drive (HDD) and a solid state drive (SSD) stores setting values set in advance. The information stored in the storage device 304 may be read and used by the CPU 301 when the CPU 301 executes a program.

The I/F 305 is an interface that allows the image forming apparatus 100 to communicate with a client PC 105.

The image forming device 306 is a print engine that forms an image on a recording medium. The image reading device 307 reads the image formed on the recording medium.

Configuration Example of Image Forming Apparatus 100

Figure 2:
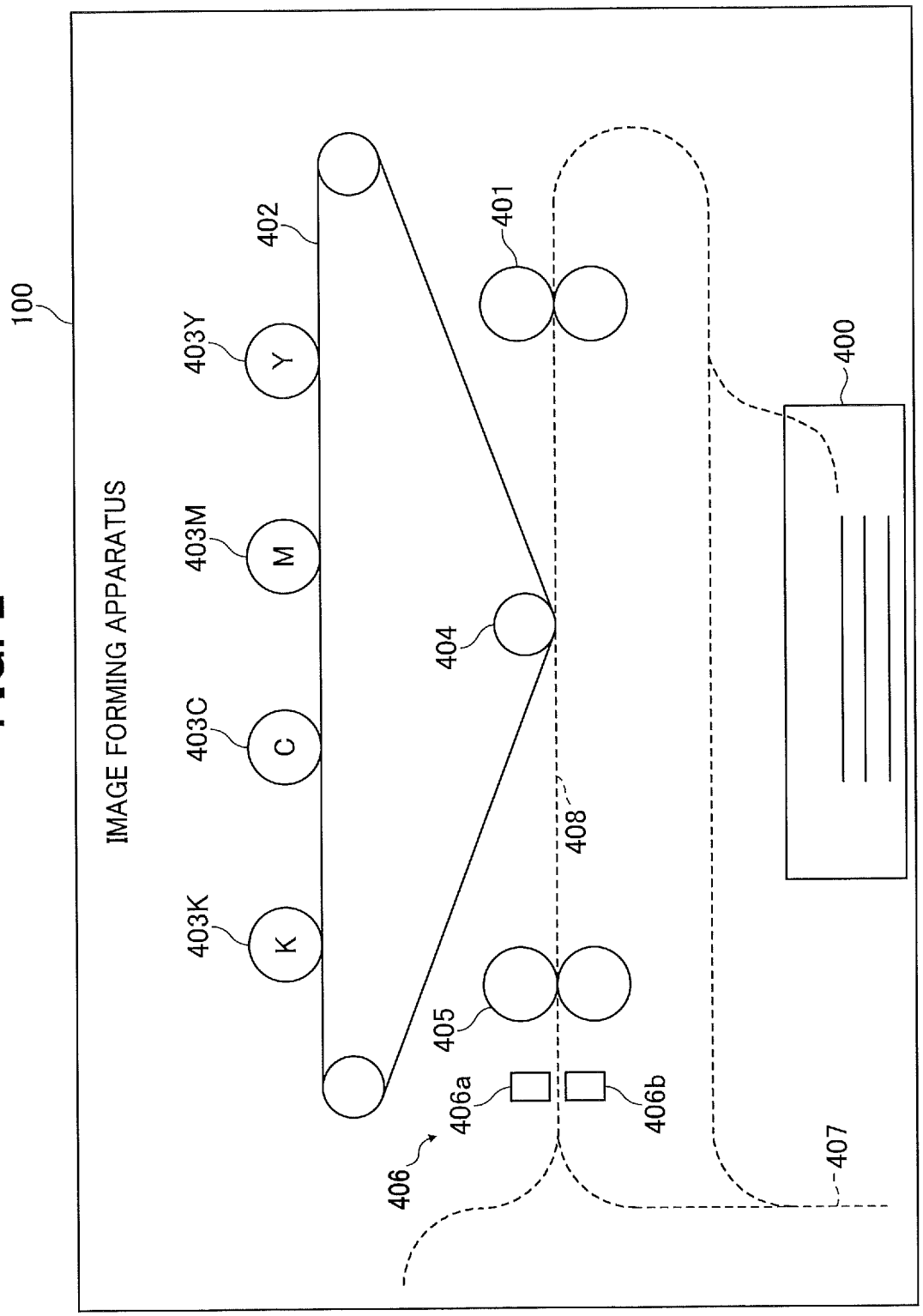
FIG. 2 is a diagram illustrating an example of a schematic configuration of the image forming apparatus according to an embodiment of the present disclosure.

Next, a description is given of the configuration of the image forming apparatus 100, with reference to FIG. 2.

FIG. 2 is a diagram illustrating an example of the configuration of an image forming apparatus 100 according to an embodiment of the present disclosure.

As illustrated in FIG. 2, the image forming apparatus 100 includes a tandem-type, electrophotographic photoconductor drums 403Y, 403M, 403C, and 403K, an intermediate transfer belt 402, a secondary transfer roller 404, a sheet feeding device 400, a conveyance roller pair 401, a fixing roller pair 405, inline sensors 406a and 406b, a reversal passage 407, and a conveyance passage 408.

Note that the suffixes of the photoconductor drums 403Y, 403M, 403C, and 403K indicate respective ink colors. To be more specific, "Y" represents yellow, "M" represents magenta, "C" represents cyan, and "K" represents black.

The image forming device 306 illustrated in FIG. 1 includes the photoconductor drums 403Y, 403M, 403C, and 403K, the intermediate transfer belt 402, the secondary transfer roller 404, and the fixing roller pair 405. The image reading device 307 illustrated in FIG. 1 includes the inline sensors 406a and 406b.

The image forming apparatus 100 is a tandem-type image forming apparatus that has a configuration in which the photoconductor drums 403Y, 403M, 403C, and 403K of colors of black, magenta, cyan, and yellow are aligned in a row along the intermediate transfer belt 402 that functions as a moving device having an endless loop. Hereinafter, the photoconductor drums 403Y, 403M, 403C, and 403K may be referred to as the "photoconductor drums 403" in a singular form. In the image forming apparatus 100, a recording medium (sheet) is fed from the sheet feeding device 400 and conveyed by a conveyance roller pair 401. An intermediate transfer image that is transferred onto the recording medium is formed on the intermediate transfer belt 402. The photoconductor drums 403Y, 403M, 403C, and 403K are aligned along the intermediate transfer belt 402, sequentially from upstream in a conveyance direction of the recording medium.

In the image forming apparatus 100, a latent image is formed on a circumferential surface of each of the photoconductor drums 403 for different colors and is developed with toner into a visible toner image. The toner images in different colors are transferred from the respective photoconductor drums 403 onto the circumferential surface of the intermediate transfer belt 402 such that the toner images are superimposed one atop another on the intermediate transfer belt 402. Thus, a composite full-color toner image (i.e., intermediate transfer image) is formed on the intermediate transfer belt 402.

Then, in the image forming apparatus 100, at a position closest to a conveyance passage 408 of the recording medium indicated by a broken line in FIG. 2, the secondary transfer roller 404 transfers the full-color image from the intermediate transfer belt 402 onto the recording medium conveyed along the conveyance passage 408.

The recording medium bearing the full-color image is further conveyed to the fixing roller pair 405 by which the full-color image is fixed to the recording medium (for image formation). In the present embodiment, the fixing roller pair 405 functions as a fixing device to fix the toner image transferred by the transfer device onto the recording medium by application of heat. The fixing roller pair 405 applies heat and pressure to the recording medium bearing the full-color toner image to fix the full-color toner image onto the recording medium. The fixing roller pair 405 generates heat by a built-in heater such as a halogen heater to heat the recording medium.

When duplex printing is performed, the image forming apparatus 100 forms an image on the front side (first face) of the recording medium, then conveys the recording medium to the reversal passage 407 in the conveyance passage 408, reverses the front and back sides (first and second faces) of the recording medium, and then conveys the recording medium again to the position of the secondary transfer roller 404.

The sheet feeding device 400 accommodates a plurality of sheets (recording media) piled one on another.

The inline sensors 406a and 406b are disposed downstream from the fixing roller pair 405 in the conveyance direction of the recording medium. Hereinafter, the inline sensors 406a and 406b may be collectively referred to as the inline sensors 406.

The inline sensors 406 read both sides of a recording medium by the fixing roller pair 405 and obtains read image of the image fixed onto the recording medium. Note that the inline sensors 406 may not be two inline sensors (inline sensors 406a and 406b) and may be a single inline sensor, e.g., the inline sensor 406a. In a case in which the inline sensor 406a alone is employed, the inline sensor 406a first reads the recording medium at the time at which an image is formed on the front side (first face) of the recording medium. Thereafter, an image is formed on the back side (second face) of the recording medium.

Each inline sensor 406 is a charge-coupled-device (CCD) line sensor in which pixels that output an electric signal corresponding to the intensity of received light are arranged in a one-dimensional array. The arrangement direction of the pixels crosses the conveyance direction of the recording medium. Each inline sensor 406 includes a pixel array that receives red light (R), a pixel array that receives green light (G), and a pixel array that receives blue light (B). In the following description, red, green, and blue may be referred to as R, G, and B, respectively.

The inline sensors 406 output an electric signal corresponding to the intensity of reflection light reflected on the image formed on the recording medium by the pixel arrays of the respective colors. The image forming apparatus 100 uses the light intensity (density) of each color of the read image read by the inline sensor 406 as color information for correcting the color of the image.

Each of the inline sensors 406 may be provided with a light source that irradiates light to the recording medium. By irradiating the recording medium with light from the light source, brightness is obtained for reading the recording medium by the inline sensors 406.

Figure 3:
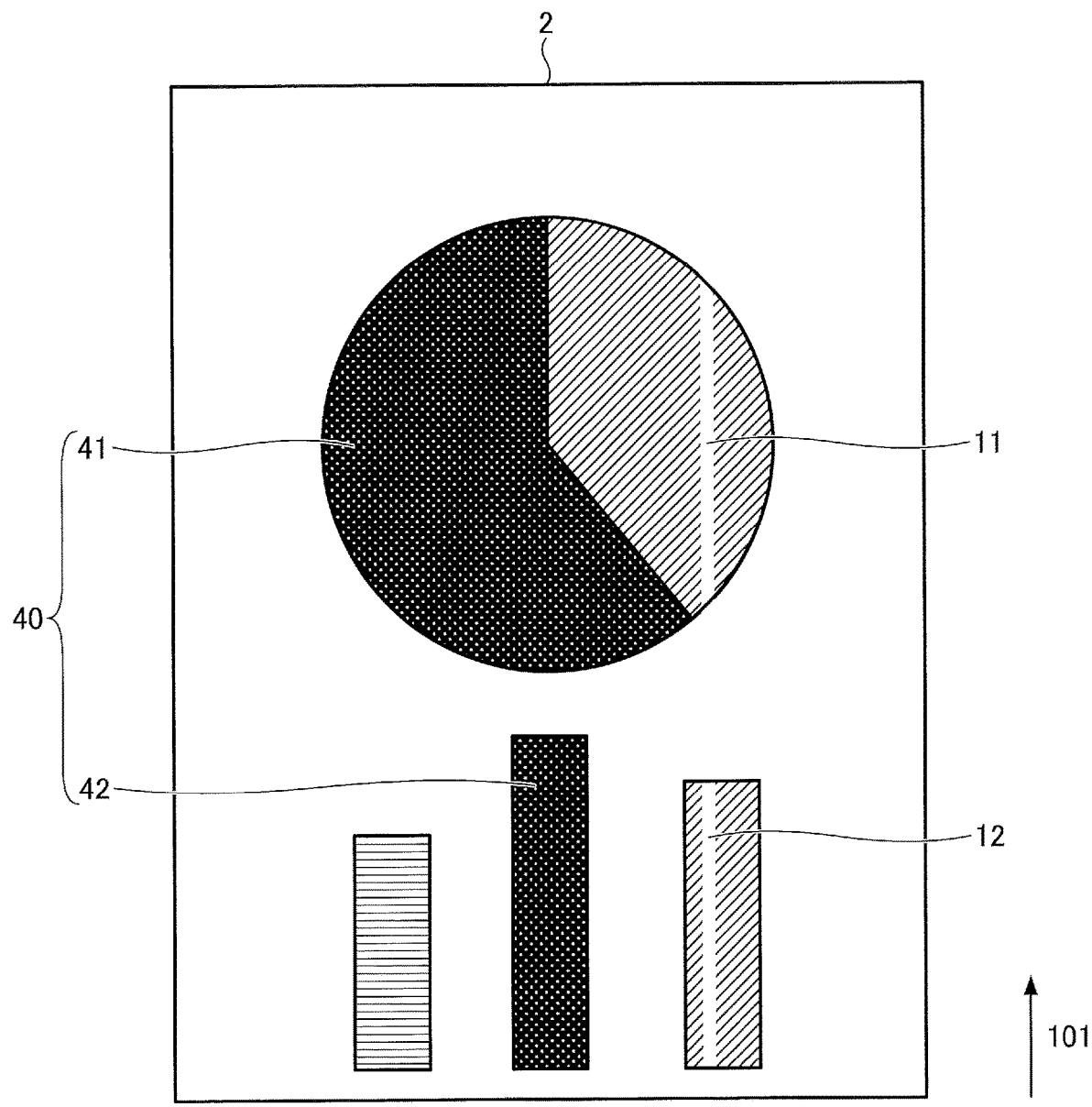
FIG. 3 is a diagram illustrating a first example of a defective image.
Figure 4:
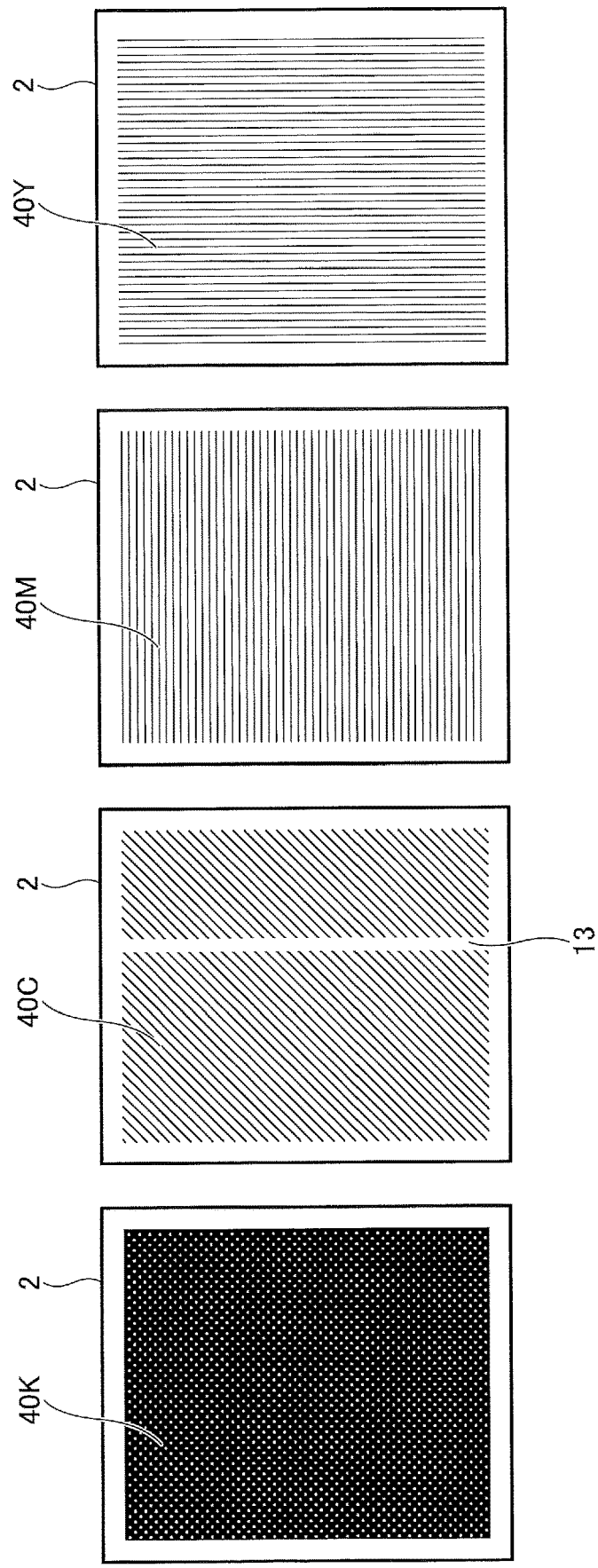
FIG. 4 is a diagram illustrating a second example of a defective image.
Figure 5:
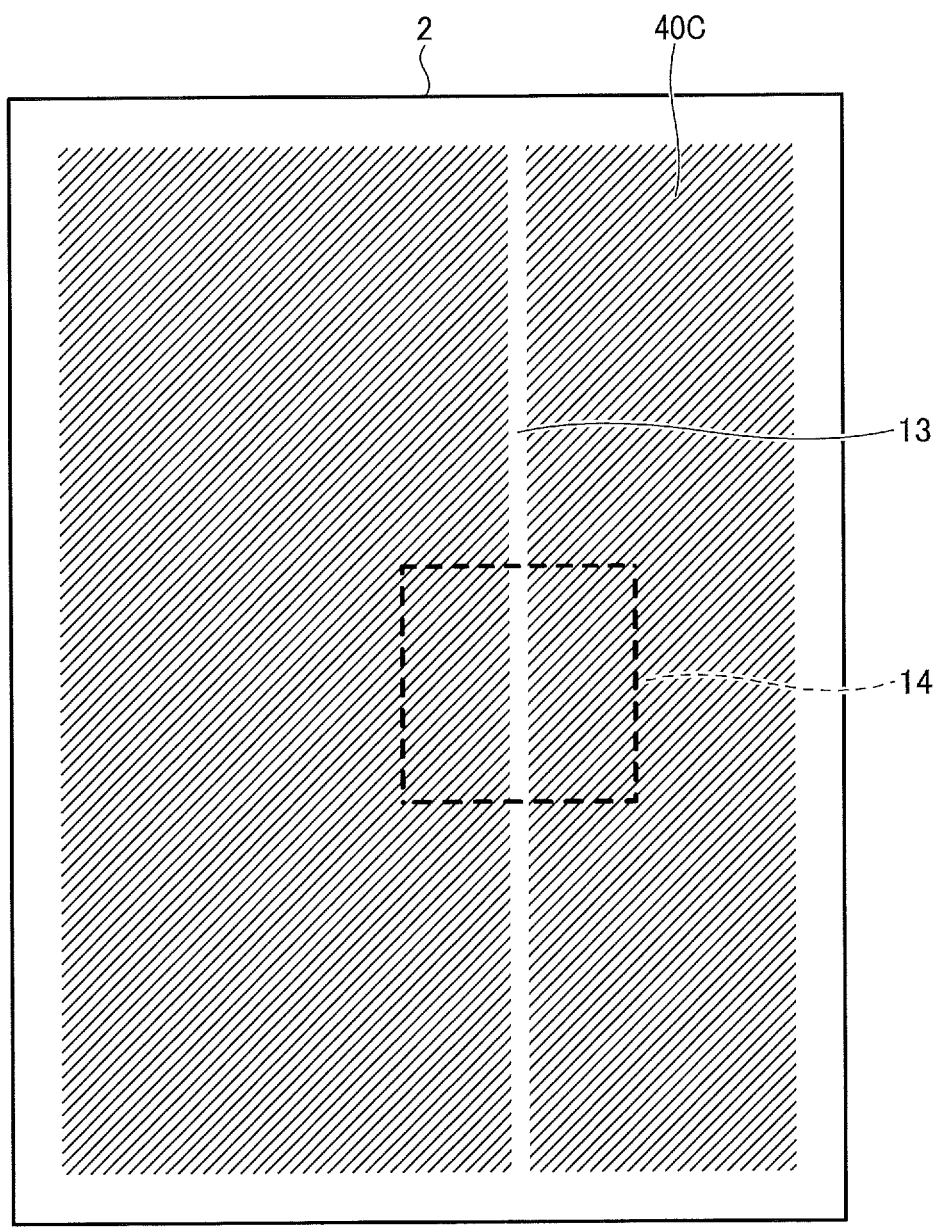
FIG. 5 is a diagram illustrating an area of a part of a printed image.

Example of Defective Image Next, a description is given of a defective image occurring in the image forming apparatus 100 and a method of determining the defective image, with reference to FIGS. 3 to 5.

FIG. 3 is a diagram illustrating a first example of a defective image.

FIG. 4 is a diagram illustrating a second example of a defective image.

FIG. 5 is a diagram illustrating an area of a part of a printed image.

As illustrated in FIG. 3, a printed image 40 is formed on a recording medium 2 by the image forming apparatus 100. The printed image 40 includes a pie chart 41 and a bar chart 42.

Each of the vertical streaks 11 and 12 is an example of a defective image in which an area having an image density different from the image density of a surrounding image in the printed image 40 linearly extends along a conveyance direction 101. The conveyance direction 101 is a direction in which the recording medium 2 is conveyed when an image is formed on the recording medium 2 by the image forming apparatus 100.

The vertical streaks 11 and 12 are likely to cause in the charger that uniformly charges each photoconductor drum using a corona discharger called a scorotron charger. In addition, there is also a vertical streak derived from, e.g., dirt constantly occurs at the same position due to, e.g., a cleaning failure.

Defective images such as the vertical streaks 11 and 12 may occur in each color. FIG. 4 illustrates four recording media 2 having respective printed images 40 formed by rectangular areas, which are a printed image 40K including a black rectangular area alone, a printed image 40C including a cyan rectangular area alone, a printed image 40M including a magenta rectangular area alone, and a printed image 40Y including a yellow rectangular area alone. As illustrated in FIG. 4, a vertical streak 13 appears in the printed image 40C alone.

When a vertical streak occurs in the process after the toner image is transferred onto the intermediate transfer belt 402, the vertical streak appears in each color. When a vertical streak is of a single color, the vertical streak occurs in the process before the toner image is transferred onto the intermediate transfer belt 402. Such a vertical stream may be determined to have occurred in a process of developing, charging, cleaning, or exposure.

Since the area of the vertical streak 13 has the image density lighter than the image density of the surrounding area, this defective image is not caused by a cleaning failure of the photoconductor drum 403C. The cleaning failure typically results in the area of the vertical streak having the image density darker than the image density of the surrounding area due to excess toner passing through, e.g., a cleaning member.

Further, the vertical streak becomes darker even when the charging is insufficient due to contamination of the charger. Therefore, it is highly likely that there is the cause in any process of development or exposure which is a process other than charging and cleaning.

To address this inconvenience, it is checked whether the cover glass included in the exposure unit is contaminated at a position corresponding to the vertical streak 13 or whether there is a portion where the developer is partially retained due to dust or foreign material included in the developing unit. By so doing, the determination of an abnormality is performed. In the determination of the abnormality, an image from which the feature of the abnormality is distinguished and the position of occurrence of the abnormality in the printed image are normally used.

On the other hand, in the determination of an abnormality, there is a demand for transmitting and receiving an image obtained by reading a printed image formed by an image forming apparatus that functions as an object to be determined among a user, an administrator, and a service person or a printing worker of the image forming apparatus. For example, there is a case where a user of the image forming apparatus 100 transmits a printed image formed by the image forming apparatus 100 to a service person in a remote place via, for example, a network, and the service person visually recognizes the received printed image to perform the determination of an abnormality.

It is more preferable that a scanner such as the image reading device 307 or various reading units including a digital camera or a smartphone camera (e.g., smartphone camera 210 described below) included in a smartphone (e.g., smartphone 200 described below) is used for reading the printed image in this case, so that the degree of freedom in selection of an image reading unit increases.

However, compared to a scanner, a digital camera or a smartphone camera has a different imaging range of a chart that is readable at the same resolution. In a case where a digital camera or a smartphone camera is to obtain the same imaging range as the imaging range of the scanner, the resolution of the digital camera or the smartphone camera of a smartphone decreases, and the features of the abnormality become unclear. Due to this configuration, the determination of an abnormality may not be performed accurately.

As illustrated in FIG. 5, when an area 14 alone that is a part of the printed image 40C is captured to ensure the resolution, the abnormality occurring position in the printed image 40C is unclear, and the image abnormality may not be determined correctly.

As a result, the degree of freedom in selection of the reading unit is limited.

First Embodiment

In the present embodiment, determination of abnormality is performed using a chart including a plurality of area images, where each area image including a figure indicating position information of the area images in the chart.

Next, a description is given of a chart 1 according to the present embodiment.

Configuration Example of Chart 1

Figure 6:
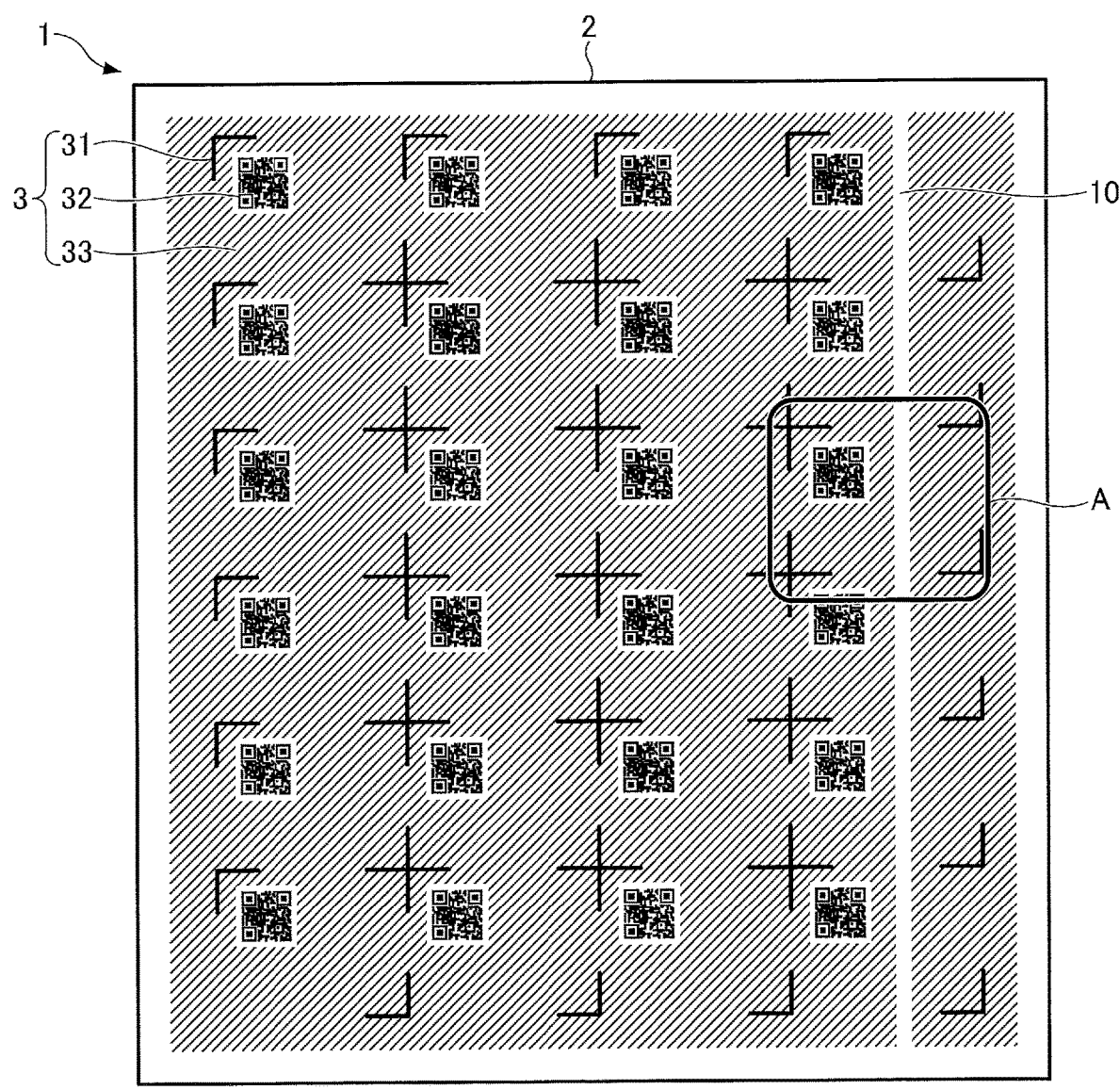
FIG. 6 is a diagram illustrating an example of a chart according to a first embodiment of the present disclosure.
Figure 7:
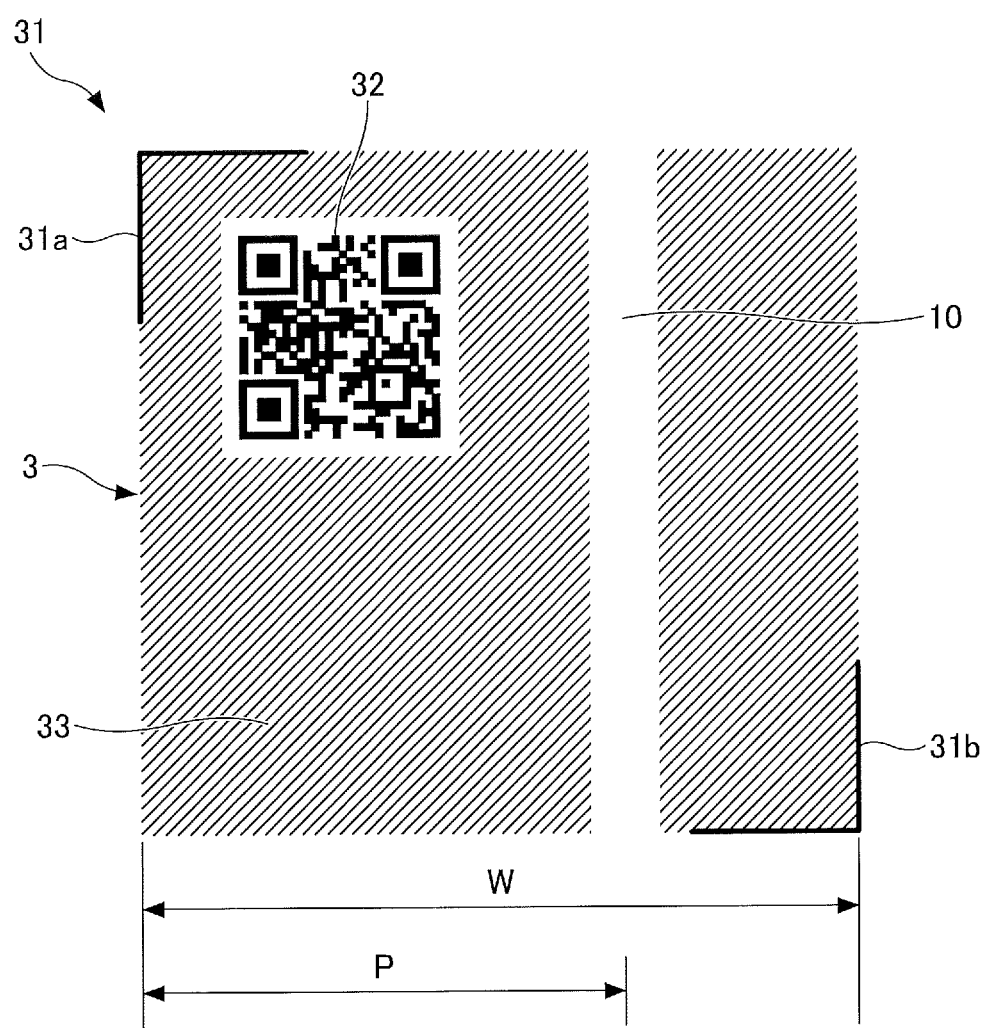
FIG. 7 is an enlarged view of an example of an area image in the chart according to the first embodiment of the present disclosure.

Next, a description is given of a configuration of the chart 1 with reference to FIGS. 6 and 7.

FIG. 6 is a diagram illustrating an example of the configuration of the chart 1 according to an embodiment of the present disclosure.

As illustrated in FIG. 6, the chart 1 includes a recording medium 2 and a plurality of area images 3. For determining an abnormality of a printed image by the image forming apparatus 100, the chart 1 according to an embodiment of the present disclosure has a plurality of area images 3 on the recording medium 2 formed by the image forming apparatus 100 that is an object to be determined (determination object).

Each of the plurality of area images 3 (each area image 3) is an image formed by an image forming apparatus, in a predetermined area A on the recording medium 2, based on image data. As illustrated in FIG. 1, the area image 3 includes a mark 31, a two-dimensional code 32, and a pattern 33.

The mark 31 is an L-shaped mark formed at an end portion of the area image 3 and indicates a range of the area image 3 in the chart 1. However, the shape of the mark may be any shape as long as the mark indicates the range of the area image 3, and the position of the mark may be an optional position.

The two-dimensional code 32 is an example of a figure indicating position information of the area image 3 in the chart 1. The two-dimensional code 32 includes, for example, a quick response (QR) code (registered trademark) or another identification code such as a bar code as long as the figure indicates the position information of the area image 3. The position and orientation of the two-dimensional code 32 in the area image 3 are not particularly limited, and the two-dimensional code 32 may be disposed at any position and in any orientation.

The pattern 33 is a rectangular pattern formed over the whole area image 3 and having a single color and substantially uniform density. However, the pattern 33 is not limited to a rectangular shape and may be appropriately selectable according to the type of a defective image that is an object to be determined.

For example, in a case where the defective image includes a streak extending linearly, it is preferable that the pattern is a rectangular pattern having a single color and substantially uniform density, e.g., the pattern 33. In a case where the defective image includes a streak having the density higher than the density of the surrounding area, it is preferable that the pattern is a rectangular pattern having a single color and substantially uniform light density. In a case where the defective image includes a streak having the density lower than the density of the surrounding area, it is preferable that the pattern is a rectangular pattern having a single color and substantially uniform dark density.

The vertical streak 10 is generated when the area image 3 is formed on the recording medium 2 by the image forming apparatus 100 that functions as an object to be determined.

Referring now to FIG. 7, a description is given of a configuration of the chart 1.

FIG. 7 is an enlarged view of a configuration of the area image 3 in the chart 1.

The area image 3 illustrated in FIG. 7 corresponds to an image that is a part of the chart 1 captured by, e.g., a smartphone camera.

As illustrated in FIG. 7, the area image 3 includes a mark 31, a two-dimensional code 32, and a pattern 33. The mark 31 include marks 31a and 31b provided at two corners among four corners included in the area image 3.

The two-dimensional code 32 includes the position information of the area image 3 in the chart 1. For example, when a predetermined reference position in the chart 1 is set to coordinates (0.0, 0.0), the two-dimensional code 32 indicates coordinates (250.0, 110.3) of a corner portion where the mark 31a is provided and coordinates (280.0, 140.3) of a corner portion where the mark 31b is provided.

When the data of the area image 3 is transmitted to a remote location, the two-dimensional code 32 is read at the remote location. By so doing, information indicating the width W of the area image 3 is acquired based on the position information indicated by the two-dimensional code 32. Further, based on the position information indicated by the two-dimensional code 32 and the position P in the area image 3, information indicating the position of the vertical streak 10 in the chart 1 is acquired.

Note that a photographer that is a user who captures an image determines which region in the chart 1 is to be captured. At this time, the photographer captures an area from which an area image 3 having the feature of the abnormality is obtained.

Effects of Chart 1

As described above, the chart 1 according to the present embodiment includes a plurality of area images 3, and each of the plurality of area images 3 includes a two-dimensional code 32 (figure) indicating the positional information of the area image 3 in the chart 1. Note that the area image 3 may include a bar code.

By so doing, even when the area image 3 obtained by capturing a part of the area in the chart 1 is received, the feature of the abnormality and the abnormality occurring position in the printed image are recognized from the area image 3, and the abnormality is accurately determined based on the area image 3.

In the present embodiment, the area image 3 includes the mark 31 indicating the range of the area image 3 in the chart 1. Since the position of the area image 3 on the chart 1 is indicated by using the position of the mark 31, the abnormality occurring position in the printed image is determined more accurately.

Figure 8:
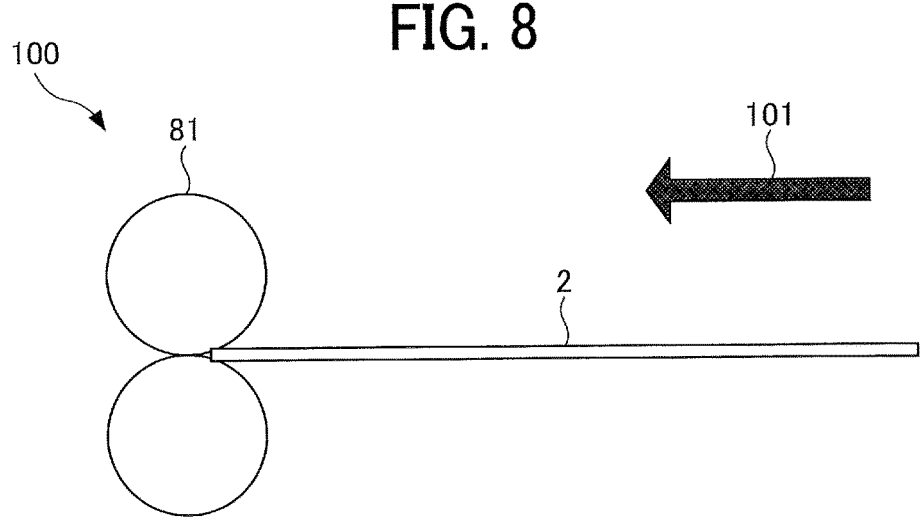
FIG. 8 is a diagram illustrating an example of occurrence of a horizontal streak.
Figure 9:
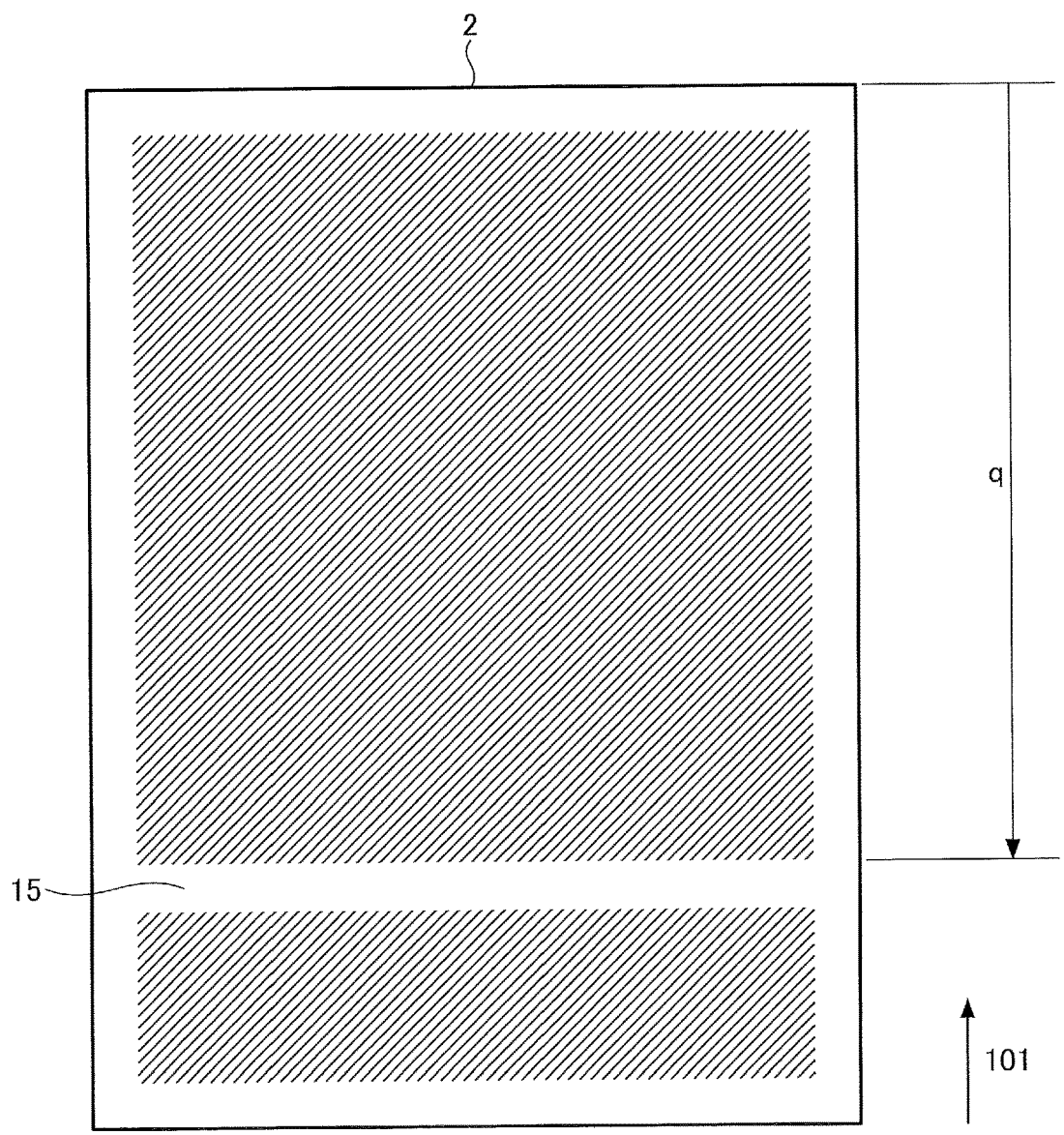
FIG. 9 is a diagram illustrating an example of a horizontal streak.

Now, a description is given of the horizontal streak as an example of defective image other than the vertical streak, with reference to FIGS. 8 and 9.

FIG. 8 is a diagram illustrating an example of generating mechanism of a horizontal streak.

FIG. 9 is a diagram illustrating an example of the horizontal streak.

As illustrated in FIG. 8, when the recording medium 2 enters a transfer roller pair 81 included in the image forming apparatus 100, vibration, i.e., shock jitters, is likely to occur due to, for example, the thickness of the recording medium 2. Due to such vibration, the distance between the transfer roller pair 81 and the recording medium 2 fluctuates, and a horizontal streak may occur in a direction orthogonal to the conveyance direction 101. The horizontal streak is an area having the density different from the density of the surrounding area. The amount of vibration increases as the thickness of the recording medium 2 increases.

Since the image vibrates when the recording medium 2 enters the transfer roller pair 81, the vibration occurs at a position corresponding to the distance between the transfer roller pair 81 and the image forming device on the recording medium 2. As illustrated in FIG. 9, a horizontal streak 15 extending in a direction orthogonal to the conveyance direction 101 occurs at a position separated by a distance q from the leading end (downstream side) of the recording medium in the conveyance direction 101. The distance q corresponds to a distance between the transfer roller pair 81 and the image forming device on the recording medium 2.

Since the horizontal streak 15 is generated due to the thickness of the recording medium 2, it is preferable that the two-dimensional code 32 further indicates the thickness information of the recording medium 2, so that the horizontal streak 15 is determined more accurately. The thickness information of the recording medium 2 is an example of image forming condition information by the image forming apparatus.

The image forming condition information further includes a screen condition of an image and color mode information such as full-color image formation or monochrome image formation.

Second Embodiment

Next, a description is given of a chart 1a according to a second embodiment of the present disclosure. Note that, in the present embodiment, identical parts or components to the parts or components described in the first embodiment are given identical reference numerals and redundant descriptions are summarized or omitted accordingly. The same condition applies to the embodiments described below.

In order to determine not only the presence or absence of an abnormality but also the degree of abnormality, it is preferable to determine how the density in the area image 3a differs from the density of another area image. However, when the area image 3a is captured, even if the same chart 1a is read, the brightness of the area image may be different depending on ambient light, imaging conditions (for example, shutter speed and gain) of a reading unit such as a smartphone camera. When the brightness of the area image 3a is different, the contrast also changes. As a result, how the density of an area image differs from the density of another area image may not be determined correctly.

In the present embodiment, the area image included in the chart 1a includes a correction patch serving as a density reference, so that the density of the area image is corrected and a defective image such as the vertical streak 10 is more accurately determined.

Figure 10:
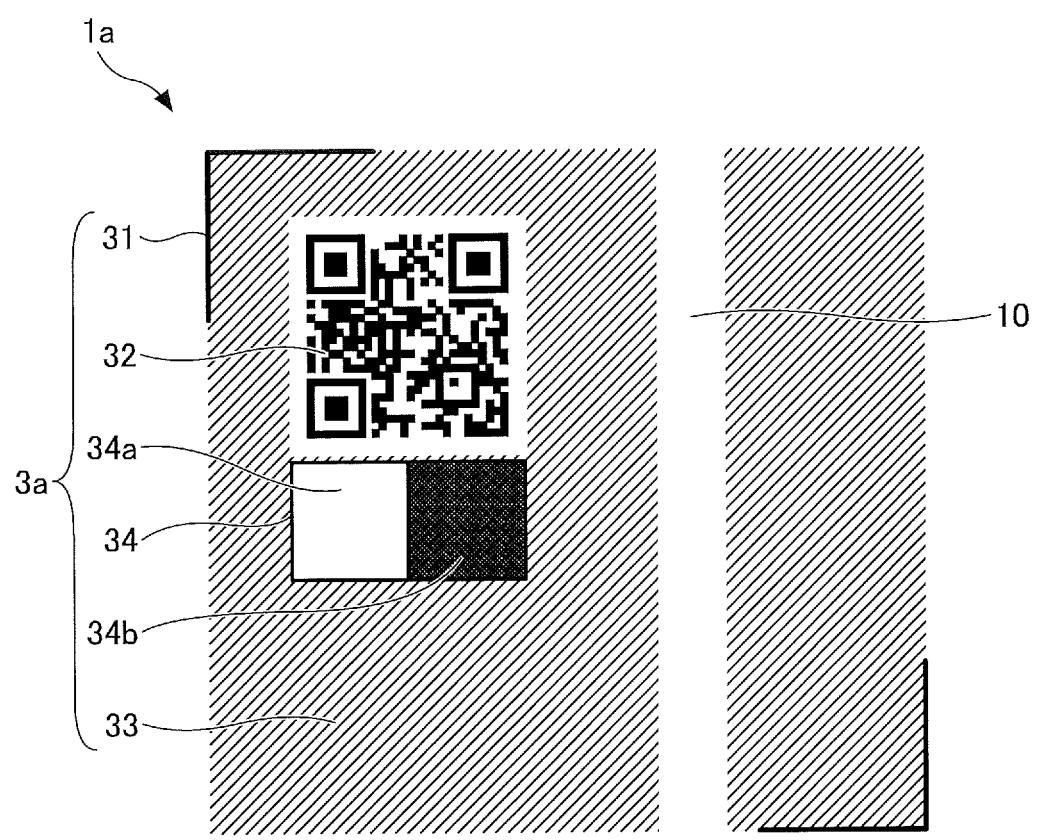
FIG. 10 is a diagram illustrating an example of an area image in a chart according to a second embodiment of the present disclosure.

FIG. 10 is a diagram illustrating an example of the area image 3a in the chart 1a according to a second embodiment of the present disclosure.

The chart 1a in FIG. 10 has an area image 3a to which the area image 3 in the configuration of FIG. 6 is replaced.

As illustrated in FIG. 10, the area image 3a includes a correction patch 34. The correction patch 34 is formed with a predetermined density. The correction patch 34 is an example of a correction pattern to correct the density of the area image 3a. The correction patch 34 includes a low density portion 34a and a high density portion 34b. The low density portion 34a is an area having low density (light area). The high density portion 34b is an area having high density (dark area).

Figure 11A:
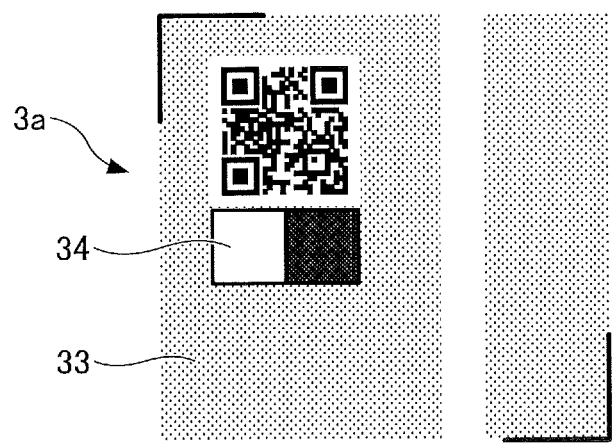
FIG. 11A is a diagram illustrating the density change of an area image when the area image is relatively bright.
Figure 11B:
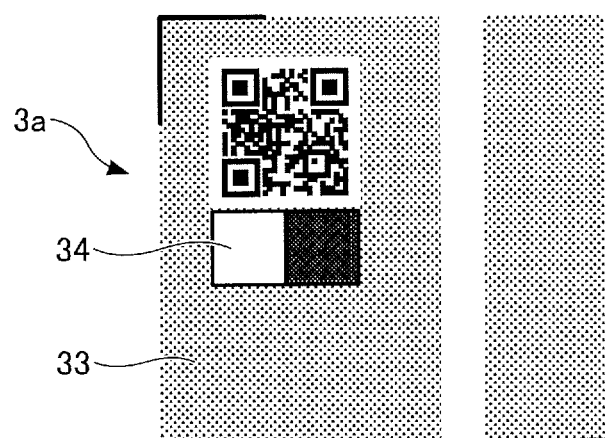
FIG. 11B is a diagram illustrating the density change of the area image when the area image is intermediate, in other words, between bright and dark.
Figure 11C:
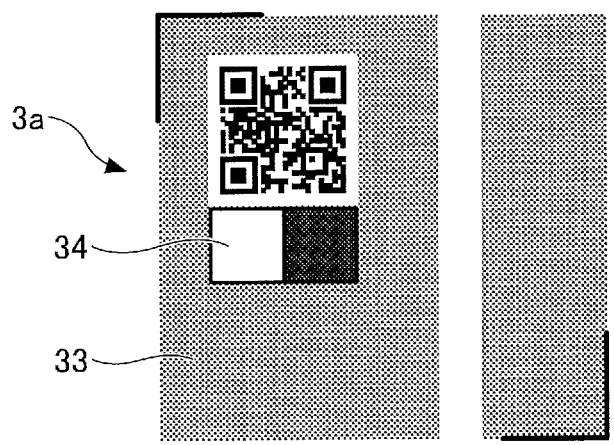
FIG. 11C is a diagram illustrating the density change of the area image when the area image is relatively dark.

FIGS. 11A, 11B, and 11C are diagrams each illustrating the density change of the area image 3 in accordance with brightness.

FIG. 11A is a diagram illustrating the density change of an area image when the area image is relatively bright.

FIG. 11B is a diagram illustrating the density change of the area image when the area image is intermediate, in other words, between bright and dark.

FIG. 11C is a diagram illustrating the density change of the area image when the area image is relatively dark.

As illustrated in FIGS. 11A, 11B, and 11C, the density of the pattern 33 in the area image 3a varies in accordance with brightness.

A density correction process is executed by an image processing apparatus including an image reading unit that captures the area image 3. In the present embodiment, the smartphone 200 is an example of an image processing apparatus, and a description is given of a smartphone camera 210 that is used as a reading unit. An image captured by the smartphone camera is an example of a read image.

Figure 12:
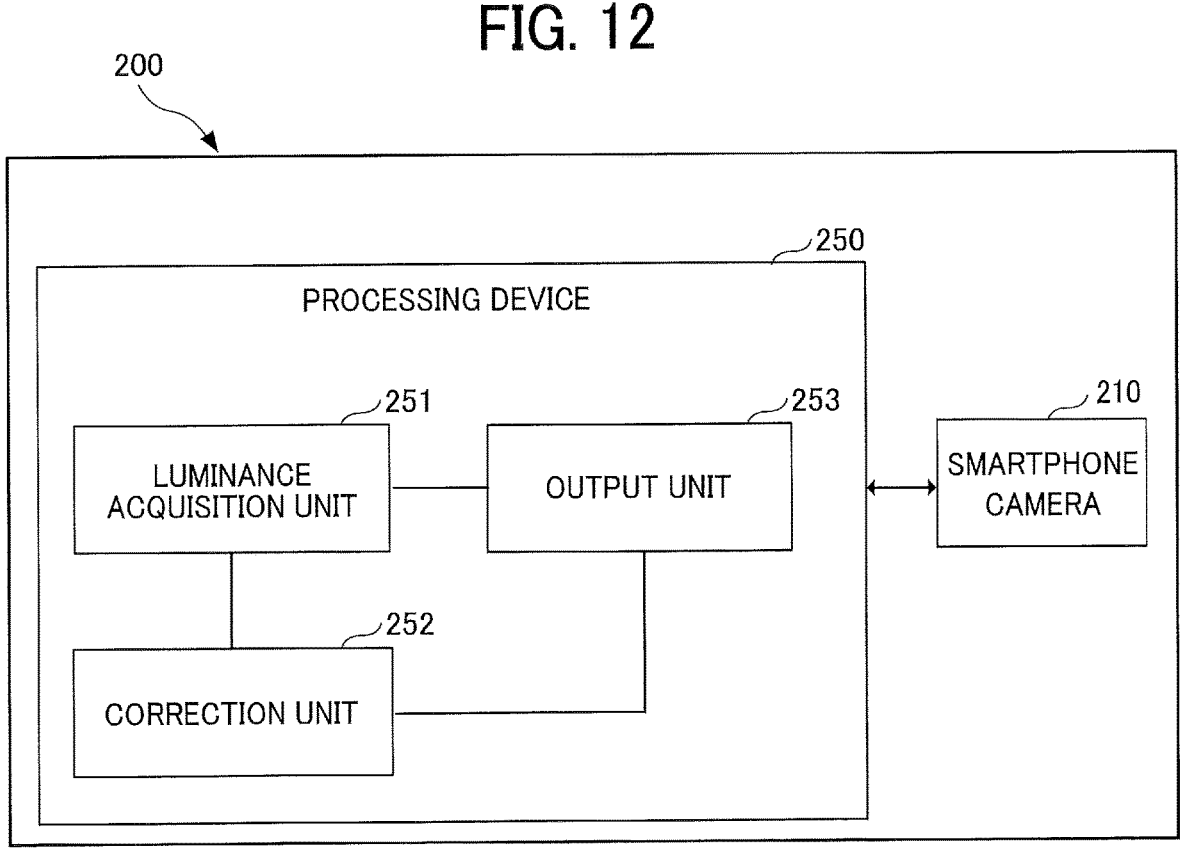
FIG. 12 is a diagram illustrating an example of a functional configuration of a smartphone.

FIG. 12 is a block diagram illustrating an example of a functional configuration of the smartphone 200 including a processing device 250.

The smartphone 200 in FIG. 12 captures the area image 3a with the smartphone camera 210.

The smartphone 200 includes the processing device 250 and a smartphone camera 210. As illustrated in FIG. 12, the processing device 250 includes a luminance acquisition unit 251, a correction unit 252, and an output unit 253. Such functional units of the processing device 250 may be implemented by an electric circuit provided in the smartphone 200. Each or some of the functional units of the processing device 250 may be implemented by software (or central processing unit (CPU)).

The luminance acquisition unit 251 acquires a captured image of the area image 3a captured by the smartphone camera 210 by inputting the captured image from the smartphone camera 210, and then acquires respective input luminance values of the low density portion 34a and the high density portion 34b of the correction patch 34. The luminance acquisition unit 251 acquires a mean value of luminance values of pixels of the low density portion 34a as an input luminance value of the low density portion 34a and acquires a mean value of luminance values of pixels of the high density portion 34b as an input luminance value of the high density portion 34b.

Based on the input luminance values acquired by the luminance acquisition unit 251, the correction unit 252 corrects the density of the area image 3a by adjusting the output characteristics for converting the input luminance value into an output luminance value so that the luminance values of the low density portion 34a and the high density portion 34b in the area image 3a fall within a predetermined reference range. The reference range defines the input luminance value of the low density portion 34a is the upper limit and the input luminance value of the high density portion 34b is the lower limit, for example, when the area image 3a is captured under the reference brightness condition.

The output unit 253 outputs the captured image that has been processed by the processing device 250, on a display of an external device or the smartphone 200.

Figure 13A:
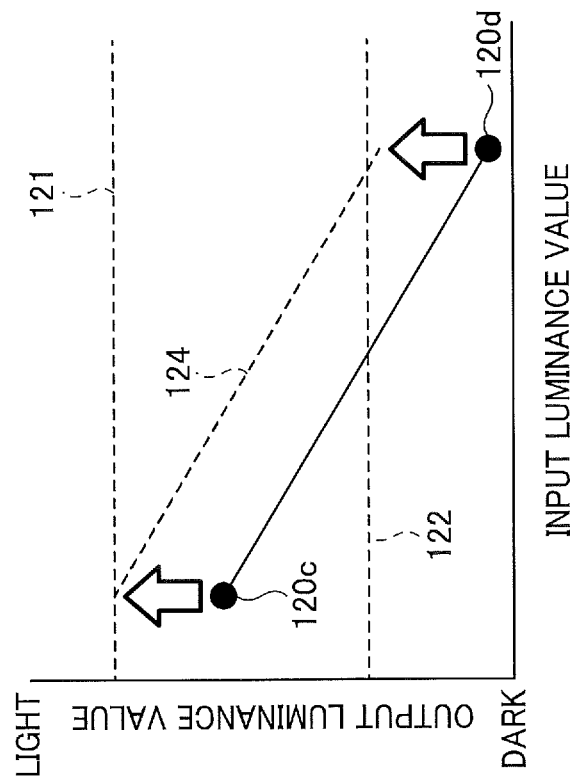
FIG. 13A is a diagram illustrating a first example of the density correction.
Figure 13B:
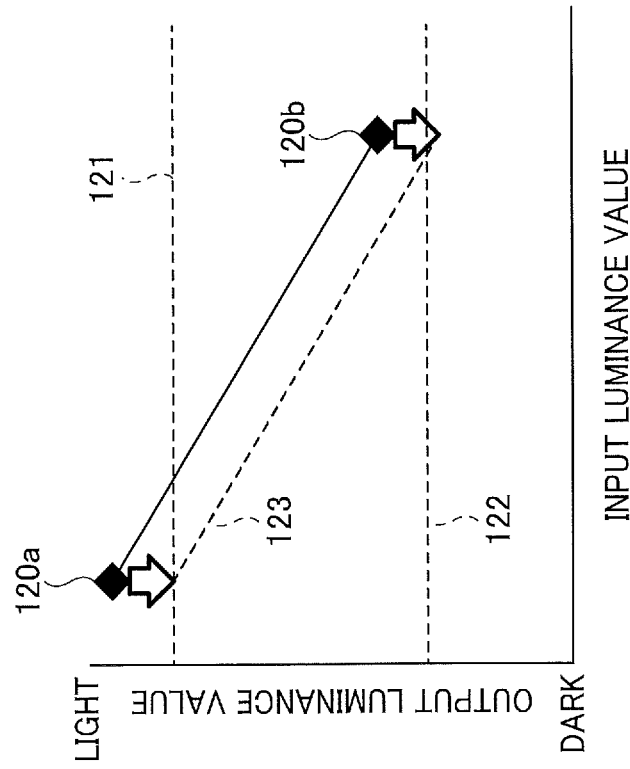
FIG. 13B is a diagram illustrating a second example of the density correction.

FIGS. 13A and 13B are diagrams, each illustrating a density correction process.

To be more specific, FIG. 13A is a diagram illustrating a first example of the density correction under a relatively light density condition and FIG. 13B is a diagram illustrating a second example of the density correction under a relatively dark density condition.

In the graphs of FIGS. 13A and 13B, the horizontal axis indicates the input luminance value of the area image 3a and the vertical axis indicates the output luminance value of the area image 3a that is output after the brightness value is corrected. An upper limit 121 indicates the upper limit in the reference range of the luminance value and a lower limit 122 indicates the lower limit in the reference range of the luminance value.

In FIG. 13A, the low density luminance value 120a indicates the luminance value of the low density portion 34a of the correction patch 34 acquired by the luminance acquisition unit 251. The high density luminance value 120b indicates the luminance value of the high density portion 34b of the correction patch 34 acquired by the luminance acquisition unit 251. The line connecting the low density luminance value 120a and the high density luminance value 120b represents the output characteristics.

Since the area image 3a is captured under a relatively light density condition, the low density luminance value 120a is lighter (higher) than the upper limit 121 and the high density luminance value 120b is lighter (higher) than the lower limit 122. The correction unit 252 corrects the output characteristics so that the low density luminance value 120a substantially matches the upper limit 121 and the high density luminance value 120b substantially matches the lower limit 122, as indicated with a broken line 123 in FIG. 13A. Note that "substantially match" corresponds to that a difference that is generally recognized as an error is allowed.

On the other hand, in FIG. 13B, the low density luminance value 120c indicates the luminance value of the low density portion 34a of the correction patch 34 acquired by the luminance acquisition unit 251. The high density luminance value 120d indicates the luminance value of the high density portion 34b of the correction patch 34 acquired by the luminance acquisition unit 251. The line connecting the low density luminance value 120c and the high density luminance value 120d represents the output characteristics.

Since the area image 3a is captured under a relatively dark (low) density condition, the low density luminance value 120c is darker (lower) than the upper limit 121 and the high density luminance value 120d is darker (lower) than the lower limit 122. The correction unit 252 corrects the output characteristics so that the low density luminance value 120c substantially matches the upper limit 121 and the high density luminance value 120d substantially matches the lower limit 122, as indicated with a broken line 124 in FIG. 13B.

FIG. 14 is a flowchart of an example of the process performed by the processing device 250.

FIG. 14 is a flowchart of a process triggered when the photographer presses a shooting button provided on the smartphone 200 and starts image capturing with the smartphone camera.

First, in step S141, the luminance acquisition unit 251 acquires a captured image of the area image 3a captured by the smartphone camera included in the smartphone 200 by inputting the captured image from the smartphone camera 210.

Then, in step S142, the luminance acquisition unit 251 acquires respective input luminance values of the low density portion 34a and the high density portion 34b of the correction patch 34.

Then, in step S143, based on the input luminance values acquired by the luminance acquisition unit 251, the correction unit 252 corrects the density of the area image 3a by adjusting the output characteristics so that the luminance values of the low density portion 34a and the high density portion 34b in the area image 3a fall within the predetermined reference range.

Then, in step S144, the output unit 253 outputs the captured image that has been processed by the processing device 250, on the display of the external device or the smartphone 200.

As described above, the processing device 250 corrects the density of a captured image of the area image 3a.

As described above, according to the present embodiment, the area image 3a included in the chart 1a includes a correction patch 34. The processing device 250 corrects, using the correction patch 34, the density of the area image 3a in the captured image obtained by capturing the area image 3a. By so doing, when determining an abnormality of an image in a sheet (e.g., recording medium), how the density in the area image 3a is different from the density of another area image is accurately determined. Due to such configurations as described above, the determination of an abnormality is accurately performed.

When the chart 1a includes the correction patch 34, the density of the correction patch 34 may vary depending on the state of the image forming apparatus 100 that forms the area image 3a on the chart 1a.

In order to deal with such a situation, the image forming apparatus 100 may include an image density sensor such as a toner concentration sensor that detects the density of a toner image formed on the intermediate transfer belt 402 and detection value information including the density values detected by the image density sensor may be indicated with the two-dimensional code 32.

After the density of the correction patch 34 in the captured image of the area image 3a is corrected based on the detection value information indicated with the two-dimensional code 32, the processing device 250 executes a process of correcting the density of the area image 3a. By so doing, the density of the area image 3a is corrected with higher accuracy.

Figure 15:
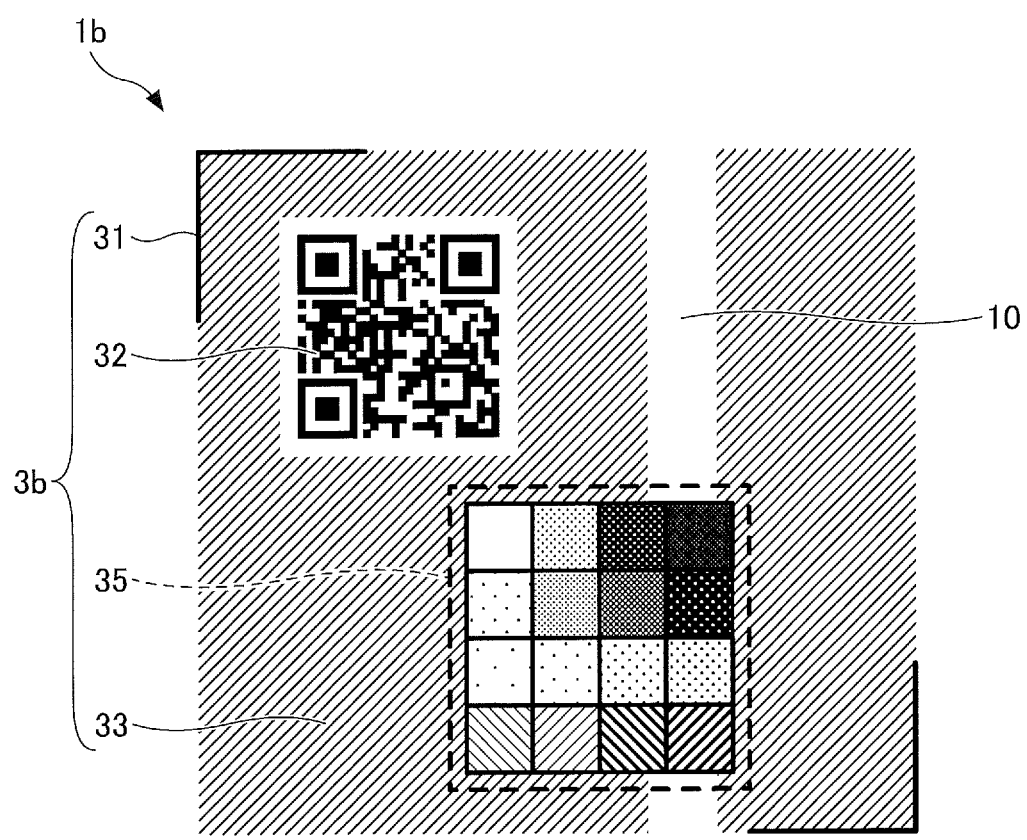
FIG. 15 is a diagram illustrating an example of an area image of a chart according to a third embodiment of the present disclosure.

FIG. 15 is a diagram illustrating an example of an area image of a chart according to a third embodiment of the present disclosure.

Further, as illustrated in FIG. 15, the area image 3a included in the chart 1a may include an attached correction patch 35 instead of the correction patch 34. The attached correction patch 35 is a correction patch attached on the surface of a chart 1b. This correction patch attached on the chart 1b is a medium printed by another offset image forming apparatus that is different from the image forming apparatus 100.

Compared to the electrophotographic image forming apparatus 100, the offset printing apparatus stabilizes the density of a printed image. Therefore, the density is corrected more accurately by performing correction using the attached correction patch 35 included in the area image 3b.

Note that the present embodiment employs the correction patch 34 including the low density portion 34a that is white and the high density portion 34b that is black. However, the present disclosure may be applied to a configuration other than the above-described configuration including the correction patch 34. The correction patch 34 may also include a plurality of intermediate density portions, such as gray. Further, in a case where the image forming apparatus handles colors, the correction patch of each color is included in the area image 3a. By so doing, the density is corrected for each color.

In addition, when the two-dimensional code 32 indicates density information of the correction patch 34, the upper limit 121 and the lower limit 122 are set using the density information, and a density target to be corrected is determined.

The present embodiment describes the configuration of a smartphone camera (i.e., smartphone camera 210) as a reading unit. However, the configuration of a reading unit applicable to the present disclosure is not limited to this configuration. The correcting process according to the present embodiment is also applied to a case where a scanner or a digital camera is used as an image reading unit.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

The above-described embodiment is applied to an electrophotographic image forming apparatus that forms an image. The present embodiment may be applied to an inkjet image forming apparatus that employs an inkjet system to form an image.

The numbers such as ordinal numbers and numerical values that indicates quantity are all given by way of example to describe the technologies to implement the embodiments of the present disclosure, and no limitation is indicated to the numbers given in the above description. In addition, the description as to how the elements are related to each other, coupled to each other, or connected to each other are given by way of example to describe the technologies to implement the embodiments of the present disclosure, and how the elements are related to each other, coupled to each other, or connected to each other to implement the functionality in the present disclosure is not limited thereby.

The embodiments also include a non-transitory, computer-readable storage medium storing computer-readable program code. For example, the program code causes a computer to execute a process of reading a chart including a plurality of area images, each area image of the plurality of area images including a figure indicating positional information of the area image of the chart and a correction pattern to correct density of the area image of the chart, processing a read image of the chart read by the reading unit, and correcting density of the read image based on density of the correction pattern in the read image of the chart. Such a non-transitory, computer-readable storage medium attains substantially the same advantages as the advantages attained by the image forming apparatuses described above.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Here, the term "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit components arranged to perform the recited functions.

What is claimed is:

1. A chart comprising:
    a plurality of area images, each area image of the plurality of area images including a figure, and the figure indicating positional information of each area image of the plurality of area images in the chart,
    wherein the positional information corresponds to an image abnormality, and
    wherein the figure includes information indicating a thickness of a recording medium on which the plurality of area images are formed.

2. The chart according to claim 1, wherein the figure includes at least one of a bar code or a two-dimensional code.

3. The chart according to claim 1, wherein each area image of the plurality of area images includes a mark indicating a range of each area image of the plurality of area images in the chart.

4. The chart according to claim 1, wherein the figure further indicates information on an image forming condition.

5. The chart according to claim 1, wherein each area image of the plurality of area images includes a correction pattern used to correct density of the plurality of area images.

6. The chart according to claim 5, wherein the figure further indicates density information of the correction pattern.

7. The chart according to claim 6, wherein the correction pattern is a pattern formed by an image forming apparatus including an image density sensor, and
    wherein the figure further indicates detection value information of density detected by the image density sensor.

8. The chart according to claim 5, further comprising a medium having the correction pattern of a predetermined density, and
    wherein the medium is attached on the chart.

9. An image forming apparatus comprising:
    an image forming device configured to form an image on a sheet to create the chart according to claim 1; and
    an image reading device configured to read the image in the chart.

10. An image processing apparatus comprising:
    processing circuitry configured to process a read image of a chart including a plurality of area images, each area image of the plurality of area images including
        a figure, the figure indicating positional information of the plurality of area images in the chart, and the positional information corresponding to an image abnormality, and
        a correction pattern to correct density of the plurality of area images in the chart,
    wherein the processing circuitry is configured to correct density of the read image based on density of the correction pattern in the read image of the chart,
    wherein the figure includes information indicating a thickness of a recording medium on which the plurality of area images are formed.

11. A non-transitory, computer-readable storage medium storing computer-readable program code that causes a computer to execute:
    processing a read image of a chart including a plurality of area images, each area image of the plurality of area images including
        a figure, the figure indicating positional information of the plurality of area images in the chart, and the positional information corresponding to an image abnormality, and
        a correction pattern to correct density of the plurality of area images in the chart; and
    correcting density of the read image based on density of the correction pattern in the read image of the chart,
    wherein the figure includes information indicating a thickness of a recording medium on which the plurality of area images are formed.

* * * * *